Patented Jan. 27, 1925.

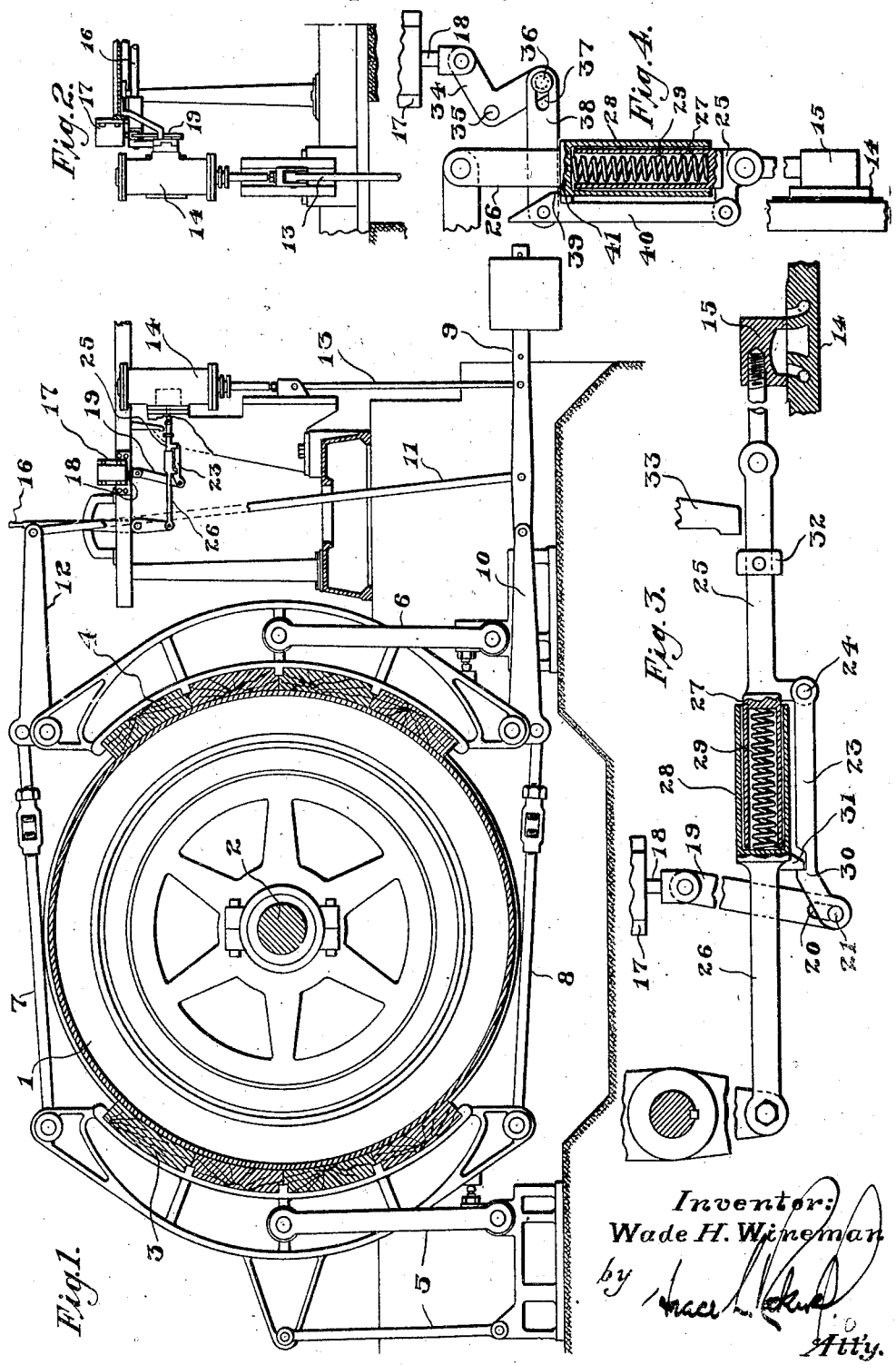

1,524,495

UNITED STATES PATENT OFFICE.

WADE H. WINEMAN, OF CHICAGO, ILLINOIS, ASSIGNOR TO SULLIVAN MACHINERY COMPANY, A CORPORATION OF MASSACHUSETTS.

BRAKE-CONTROLLING MECHANISM.

Application filed May 9, 1917, Serial No. 167,443. Renewed October 30, 1923.

*To all whom it may concern:*

Be it known that I, WADE H. WINEMAN, a citizen of the United States, residing at Chicago, in the county of Cook and State of Illinois, have invented certain new and useful Improvements in Brake-Controlling Mechanism, of which the following is a full, clear, and exact specification.

My invention relates to brake controlling mechanism.

It has for its object to provide an improved brake controlling mechanism and one especially adapted to use in connection with hoists or the like, such as those used in mines, although the same is not limited to adaptation to such devices. A further and more specific object of my invention is to provide an improved automatically acting brake controlling mechanism which is especially adapted to use in connection with electric driven or controlled systems such as electric hoists, the same being provided with means whereby when the current fails for any reason the brake is automatically applied. These and other objects and advantages of my improved construction will, however, hereinafter more fully appear.

In order that my invention may be clearly and fully disclosed, I have shown for purposes of illustration in the accompanying drawings, two embodiments which my invention may assume in practice.

In these drawings,—

Fig. 1 is a side elevation of my invention applied to a hoisting drum such as is used in mines.

Fig. 2 is an end elevation of a portion of the mechanism shown in Fig. 1.

Fig. 3 is a side elevation of the latching mechanism of the controlling mechanism, portions of the same being shown in section to facilitate illustration.

Fig. 4 is a similar view of a modified form of the same.

In this illustrative construction, I have shown a hoisting drum 1 rotatable about a suitable axis 2 and engaged by suitably shod brake members 3, 4, mounted on pivotal supports 5 and 6 of usual construction, and pivotally connected at their upper and lower ends by transverse adjustable link connections 7 and 8 of usual construction. As usual, these link connections are preferably operated by gravity to apply the brake through the action of an adjustably weighted lever 9 pivotally connected to a lower bell crank 10, pivoted to the link 8 and to the brake member 4, the weighted lever 9 also being pivotally connected through a rod 11 to an upper bell crank 12, corresponding to the bell crank 10. As is usual in such constructions, the weighted arm 9 is also raised to release the brake through a link connection 13 operatively connected to the controlling mechanism of any suitable motor, such for instance as a pressure fluid motor 14, having its ports controlled by a suitable valve 15 which is in turn operated through improved connections hereinafter described, either by a suitable adjustable controlling lever 16 or by improved automatically acting controlling mechanism likewise hereinafter described.

In my improved construction, means have been provided whereby when for any reason the current either operating the hoist or controlling the same is cut off, the brake members 3, 4 are automatically applied to the drum 1. These means, as best shown in Fig. 3, include a solenoid 17 suitably connected by suitable connections (not shown) to the line through which current is supplied to the various hoisting mechanisms or to the controlling mechanism or circuits therefor (not shown). As shown, this solenoid 17 is provided with an extension 18 on its core, and preferably pivoted to this core is a link 19, which may be of any desired length and is preferably disposed at a slight angle with respect to the axis of the core for a purpose hereinafter described. The lower end of this link is herein shown to be longitudinally slotted, as at 20, and to carry in this slot a pin 21 which is connected to a pivoted lever or latch 23 pivoted at 24 on one of the elements 25 of a two-part expansible link connection 25, 26 pivotally connected between the lever 16 and the valve 15, the latch 23 normally holding this connection in contracted position. As illustrated herein, the members 25, 26 of this connection are each provided with recessed telescoping ends 27, 28 of which the member 27 is herein adapted to be received within the member 28 and to house a coiled spring 29 normally acting to separate the members 25 and 26. When, however, the latch 23 is moved over into the position shown, a nose 30 thereon engages with a cooperating portion 31 on the member 26 and locks the two parts 25 and 26 together in such a manner as to form a substantially rigid connection between the lower end of the lever 16 and the valve 15 controlling the motor 14. In a preferred form, an adjustable collar 32 is preferably provided on one of these members, as for instance the member 25, and adapted to engage with a suitable stop 33 formed on the frame, in such a manner as to resrict the expansive connection to expansion within the desired limits and prevent the complete separation of the members 25 and 26 when the latch is released.

In the operation of my improved device, when the current passing through the solenoid 17 fails for any reason, the extension 18 on the core of the solenoid will of course drop. As a result, and due to the pull of gravity, the link 19 which is attached thereto will drop with considerable force within the limits of the slot 20 and thereby cause the upper end of that slot to strike the pin 21 with a hammer blow. As a result, the member 23 will be driven downward, and the nose 30 thereon will be pushed out of engagement with the projection 31 in such a manner as to permit the spring 29 to act between the members 25 and 26 and thereby instantaneously reciprocate the member 25 to operate the motor valve 15 to throw the motor 14 into reverse operation so that the weighted lever 9 is moved downward by gravity and by the fluid pressure motor in such a manner as instantaneously to set the brake. Obviously, this reciprocating movement of the member 25 will be limited by the stop 33 before the portions 27 and 28 of the members 25 and 26 are separated, so that when it is desired to release the brake it is only necessary to reset the latch.

In the normal operation of the hoist, it will be noted that due to the connection between the latch and the solenoid, the members 25, 26 may be freely moved back and forth manually without in any way interfering with the latch. On the other hand, upon failure of current in any part of the system, it will be noted that this latch is instantly opened, the application of the brake mechanism occurring automatically and substantially simultaneously with any current failure in such a manner that all dependence upon the operator is entirely eliminated. More specifically, it will be noted that as the current fails and as the solenoid core drops, due to its weight the link 19 drops quickly and with a quick and positive hammer action opens the latch 23 and thereby relases the spring 27 so that through the reciprocation of the member 25 the connections to the motor 14 are instantaneously changed in such a manner as to let the weighted lever 9 drop freely of its own weight and through its lever connections thus apply the brake. Attention should also be directed to the fact that due to the provision of my improved connection 25, 26, and the controlling and actuating mechanism therefor, it is also impossible for an operator by manipulation of the lever 16 to release the brake mechanism after it has been thus automatically set while the current conditions are abnormal as the latch mechanism remains down until the current flow through the solenoid 17 is reestablished. When this occurs, however, the latch is automatically raised and then obviously the same may be reset by a simple manipulation of the lever 16 in such a manner as to reinstate the manual control.

In Fig. 4 I have illustrated a modified form of the construction shown in Figs. 1, 2, and 3, wherein it will be noted that instead of providing a simple link, as the link 19, I have provided a bell crank 34 which may be suitably pivoted at 35 and may itself carry a pin 36. In this construction, when the extension 18 on the solenoid core is dropped, the bell crank will be swung about its pivot and the pin 36 brought with a decided hammer blow against one end of a horizontally disposed slot 37 formed in a horizontally disposed link 38, in such a manner as to push the latter out and cause the latch 39 of a pivotally connected latch member 40 to be disengaged from a projection 41 on the member 26. Obviously, however, various other forms of connections may be employed whereby the latching mechanism may be broken and the brake automatically set, and whereby a hammer blow for breaking these connections may be obtained when the solenoid core is dropped.

While I have in this application specifically described two embodiments which my invention may assume in practice, it should be understood that my invention is not limited to embodiment in these forms and that it is my intention to include within the scope of the appended claims all modifications of the invention falling within its spirit.

What I claim as new and desire to secure by Letters Patent is:

1. In combination, a braking device for an electrically driven mechanism, and controlling mechanism for said braking device comprising electric and manual controlling means for said mechanism, said electric means upon failure of current supply to the electrically driven mechanism being adapted to prevent entirely any braking action by said manual means.

2. In combination, a braking device for an electrically driven mechanism, and controlling means for said device comprising electric and manual controlling means for said mechanism, said electric means throughout cessation of current supply to the electrically driven mechanism being adapted to prevent entirely any braking action by said manual means.

3. In combination, a braking device for an electrically driven mechanism, and controlling means for said device comprising electric and manual controlling means for said mechanism, said manual controlling means being made entirely inoperative to effect any braking action upon failure of current supply to the electrically driven mechanism.

4. In combination, a braking device for an electrically driven mechanism, and controlling means for said device comprising electric and manual controlling means for said mechanism, said manual controlling means being made entirely inoperative to effect any braking action by said electric means upon failure of current supply to the electrically driven mechanism.

5. In combination, a braking device, controlling mechanism therefor including a prime mover, electric controlling means for said mechanism and prime mover, and manual controlling means therefor for resetting said electric means.

6. In combination, a braking device, fluid actuated controlling mechanism therefor, electric controlling means for said mechanism, and manual controlling means therefor for resetting said electric means.

7. In combination, a braking device, controlling mechanism therefor, electric controlling means for said mechanism, and manual controlling means normally operable independently of said electric means and operative to reset the latter and adapted to further control said mechanism after said resetting occurs.

8. In combination, a braking device, controlling mechanism therefor, electric controlling means for said mechanism responsive to failure of current flow, and manual controlling means for resetting said electric means to further control the same after said resetting.

9. In combination, a braking device, controlling mechanism therefor, electric controlling means for said mechanism responsive to failure of current flow, and manual controlling means for resetting said electric means and releasing said braking device only after resumption of and during current flow.

10. In combination, a braking device, controlling mechanism therefor, electric controlling means for said mechanism responsive to failure of current flow, and manual controlling means operative to wholly control said braking device during current flow and operative to reset the electrical means during current flow.

11. In a controlling device, a manual control member, an automatic control member movable therewith, restraining means for the latter, and electrical control means for said restraining means, the latter being being adapted to be set, when current is being supplied to said electric control means, by movement of said manual control member.

12. In a controlling device, manual operating means, automatic operating means movable with said manual means and normally held locked thereto, and electric control means adapted to unlock the automatic means on failure of current and to lock the same upon movement, subsequent to restoration and during flow of current, of said manual means.

13. In a controlling device, manual controlling means, electrical controlling means, and automatic operating means controlled by said electric control means adapted to be set by movement of said manual controlling means when current is supplied to said electric means and movable with the manual means thereafter but automatically releasable therefrom by said electric means upon current failure.

14. In a controlling device, manual operating means, automatic operating means normally locked to said manual operating means, and electric means for unlocking said automatic means upon failure of current and for automatically locking the same when said manual controlling means is moved in one direction.

15. An electric hoisting system, brake mechanism therefor, manual controlling mechanism therefor including a latch and a pair of members tending to move longitudinally relative to each other and adapted in one position to be held against such movement by the latch, and means responsive to failure of current in said system for breaking said latch and causing operation of said braking mechanism.

16. In an electric hoisting system, braking mechanism therefor, manual controlling mechanism for the latter including a latch and a pair of elements tending to move longitudinally relative to each other to cause operation of said braking mechanism and held against such movement by said latch, and means responsive to failure of current in said system for breaking said latch and causing application of said brake mechanism.

17. In a brake controlling mechanism, a gravity operated braking mechanism, a controlling device therefor, a manual lever to actuate said controlling device, and a link connecting said controlling device and said lever and having between its ends automatic means to control said gravity operated braking mechanism.

18. A trip mechanism comprising, in combination with a device to be moved, a member attached thereto, a member having one end thereof normally stationary and telescopically mounted with respect to said first mentioned member, means to hold said members in telescoped relation, and means to release said holding means.

19. In a brake controlling mechanism, a brake adapted to control an electrically driven member, a weight adapted to cause application of said brake, a fluid pressure motor adapted to raise said weight to release said brake and to cooperate with said weight in applying said brake, and automatic means operative upon failure of current supply to said electrically driven member for controlling application of said brake.

20. In a brake controlling mechanism, braking mechanism, manually operated controlling mechanism therefor including a normally closed latch, and automatically operating means for opening said latch with a hammer blow and rendering said controlling mechanism inoperative.

21. In a brake controlling mechanism, braking mechanism, manually operated controlling mechanism therefor including a normally closed latch, means for automatically actuating said controlling mechanism upon release of said latch, and automatically acting means for successively releasing said latch with a hammer blow and returning the same into position to be reset.

22. In an electric hoisting system, manually controlled braking means comprising normally operative means including a latch, and means responsive to a decrease in current flow in said system for striking said latch a hammer blow and applying said braking means.

23. In a brake controlling mechanism, a gravity operated braking mechanism, manually controlled means for releasing the same including cooperating spring pressed elements, and means for latching the same together.

24. In a brake controlling mechanism, a braking mechanism, manually controlled means for controlling the same including cooperating spring pressed elements, means for latching said elements together, and electroresponsive means for controlling said latch.

25. In a brake controlling mechanism, a gravity operated braking mechanism, manually controlled means for releasing the same including cooperating spring pressed elements, means for latching said elements together, and electroresponsive means for controlling said latch.

26. In a brake controlling mechanism, a gravity operated braking mechanism, manually controlled means for releasing the same including cooperating spring pressed elements, means for latching said elements together, and electroresponsive means for releasing said latch.

27. In a brake controlling mechanism, a braking mechanism, manually controlled means for controlling the same including cooperating spring pressed elements, means for latching said elements together, an electroresponsive device and means connected thereto and to said latch for releasing the latter.

28. In a brake controlling mechanism, a gravity operated braking mechanism, manually controlled means for releasing the same including cooperating spring pressed elements, means for latching said elements together, an electroresponsive device, and means connected thereto and to said latch for releasing the latter.

29. In a brake controlling mechanism, a gravity operated braking mechanism, manually controlled means for releasing the same including cooperating spring pressed elements, means for latching said elements together, an electroresponsive device, and a link connected thereto and to said latch having a limited free movement relative to the latter.

30. In a brake controlling mechanism, a gravity operated braking mechanism manually controlled means for releasing the same including cooperating spring pressed elements, means for latching said elements together, an electroresponsive device, and means controlled thereby for releasing said latch with a hammer blow.

31. In a brake controlling mechanism, manually operated controlling means therefor including a normally closed latch mechanism, comprising a plurality of cooperating elements operatively connected when unlatched, and automatically operating means for releasing said latch mechanism having provision for maintaining one of the elements of said latch mechanism in a position wherein said latch mechanism may be caused to be reset on a predetermined movement of the other latch element.

32. In a brake controlling mechanism, braking mechanism, manually operated controlling mechanism therefor including a normally closed latch and fluid controlling mechanism, and automatically operating means for releasing said latch having provision whereby in a predetermined condition of said means said latch may be automatically reset without change in said condition.

33. In a brake controlling mechanism, braking mechanism, a manually operated controlling means therefor including a normally closed latch operative to influence in varying degrees said braking mechanism when said latch is closed, and automatically operating means for releasing said latch having provision whereby said latch may be reset by simple manipulation of said controlling means.

34. In a brake controlling mechanism for an electrically operated device, braking mechanism, manually operated controlling mechanism therefor including a normally closed latch, and means automatically operative wholly independently of said manual means for releasing said latch to set said brake on cessation of current flow to said electrically operated device and having provision whereby said latch may be automatically reset when current flow has been restored and is continuing.

35. In a brake controlling mechanism, braking mechanism, manually operated control means therefor including a manually operable control member and a normally closed latch adapted to control said mechanism only when said latch is closed, and automatically operating means for releasing said latch having provision whereby in a predetermined position thereof said latch may be reset merely by manipulation of said manually operable control member.

36. In combination, a braking device for a mechanism driven by a power medium, and control mechanism for said braking device comprising controlling means governed by said power medium and manual controlling means, said first mentioned controlling means upon failure of power medium supply to the mechanism driven thereby being adapted to render said manual means entirely inoperative relative to performing any braking action.

37. In combination, a braking device for a mechanism driven by a power medium, and control mechanism for said braking device comprising controlling means governed by said power medium and manual controlling means, said first mentioned controlling means upon cessation of power medium supply to the mechanism driven thereby being adapted to render said manual means entirely inoperative relative to performing any braking action.

38. In combination, a power actuated rotatable mechanism, a braking device therefor, a fluid operated piston and cylinder operatively connected to said device and adapted upon fluid supply to said cylinder to release said device, and means automatically operative to allow said brake to be applied upon failure of power to said mechanism.

39. In combination, a power actuated rotatable mechanism, a braking device therefor, a motor controlled braking device therefor, means operative to control said motor during power flow to said mechanism, and manual means for controlling said motor while said other means is operative.

40. In combination, a power actuated rotatable mechanism, a braking device therefor, a cylinder and piston therein operatively connected to said device, means for supplying pressure fluid to said cylinder to release said device, and means automatically operative upon failure of power flow to said mechanism for allowing the application of said device.

41. In combination, a power actuated mechanism, a braking device therefor, a fluid pressure cylinder and piston therein one of which is operatively connected to said device for releasing the same, means automatically operative upon failure of power flow to said mechanism for allowing application of said device, and means including manual means adapted to control the operation of said piston and cylinder and adapted to have any one of a plurality of positions during operation of said automatic means without effecting the operation of the latter.

In testimony whereof I affix my signature.

WADE H. WINEMAN.